United States Patent
Kosmehl et al.

(10) Patent No.: US 6,463,795 B2
(45) Date of Patent: Oct. 15, 2002

(54) METHOD FOR TESTING AN INTERNAL COMBUSTION ENGINE FOR ASSEMBLY AND/OR MANUFACTURING FAULTS

(75) Inventors: Torsten Kosmehl, Velbert; Hans-Jürgen Kemnade, Dorsten, both of (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 09/808,583

(22) Filed: Mar. 14, 2001

(65) Prior Publication Data

US 2001/0045123 A1 Nov. 29, 2001

Related U.S. Application Data

(63) Continuation of application No. PCT/EP00/06055, filed on Jun. 29, 2000.

(30) Foreign Application Priority Data

Jul. 14, 1999 (DE) .......................... 199 32 866

(51) Int. Cl.$^7$ .............................................. G01M 15/00
(52) U.S. Cl. ........................... 73/116; 73/47; 73/118.2
(58) Field of Search .............................. 73/47, 46, 116, 73/117.2, 117.3, 118.1, 118.2, 119 R, 120

(56) References Cited

U.S. PATENT DOCUMENTS

| | | | | |
|---|---|---|---|---|
| 2,212,466 A | * | 8/1940 | Bradford | 73/47 |
| 3,320,801 A | * | 5/1967 | Rhindress, Jr. | 73/47 |
| 4,448,063 A | | 5/1984 | Mudge et al. | |
| 4,633,707 A | * | 1/1987 | Haddox | 73/47 |
| 4,719,792 A | * | 1/1988 | Eriksson | 73/47 |
| 5,365,773 A | * | 11/1994 | Graze, Jr. et al. | 73/47 |
| 5,417,109 A | * | 5/1995 | Scourtes | 73/47 |
| 5,497,755 A | * | 3/1996 | Maloney | 123/572 |
| 5,515,712 A | * | 5/1996 | Yunick | 73/119 R |
| 5,945,593 A | * | 8/1999 | Magiera et al. | 73/47 |

FOREIGN PATENT DOCUMENTS

| | | |
|---|---|---|
| DE | 196 54 137 A1 | 7/1998 |
| EP | 0 456 244 B1 | 11/1991 |
| EP | 0 536 561 A1 | 4/1993 |
| JP | 7146216 * | 6/1995 |

* cited by examiner

*Primary Examiner*—Eric S. McCall
(74) *Attorney, Agent, or Firm*—Laurence A. Greenberg; Werner H. Stemer; Ralph E. Locher

(57) ABSTRACT

A method for testing an internal combustion engine for assembly and manufacturing faults. In methods of this type, the torque of an electric traction motor has hitherto been determined, specific torque values being an indication of faulty engines. So that the procedure can be carried out without the complicated torque measurement, during the traction movement an air volume entering a crankcase ventilation system is measured. The measurement value is compared with desired values of a fault-free internal combustion engine and assembly and/or manufacturing faults are inferred from deviations.

5 Claims, 1 Drawing Sheet

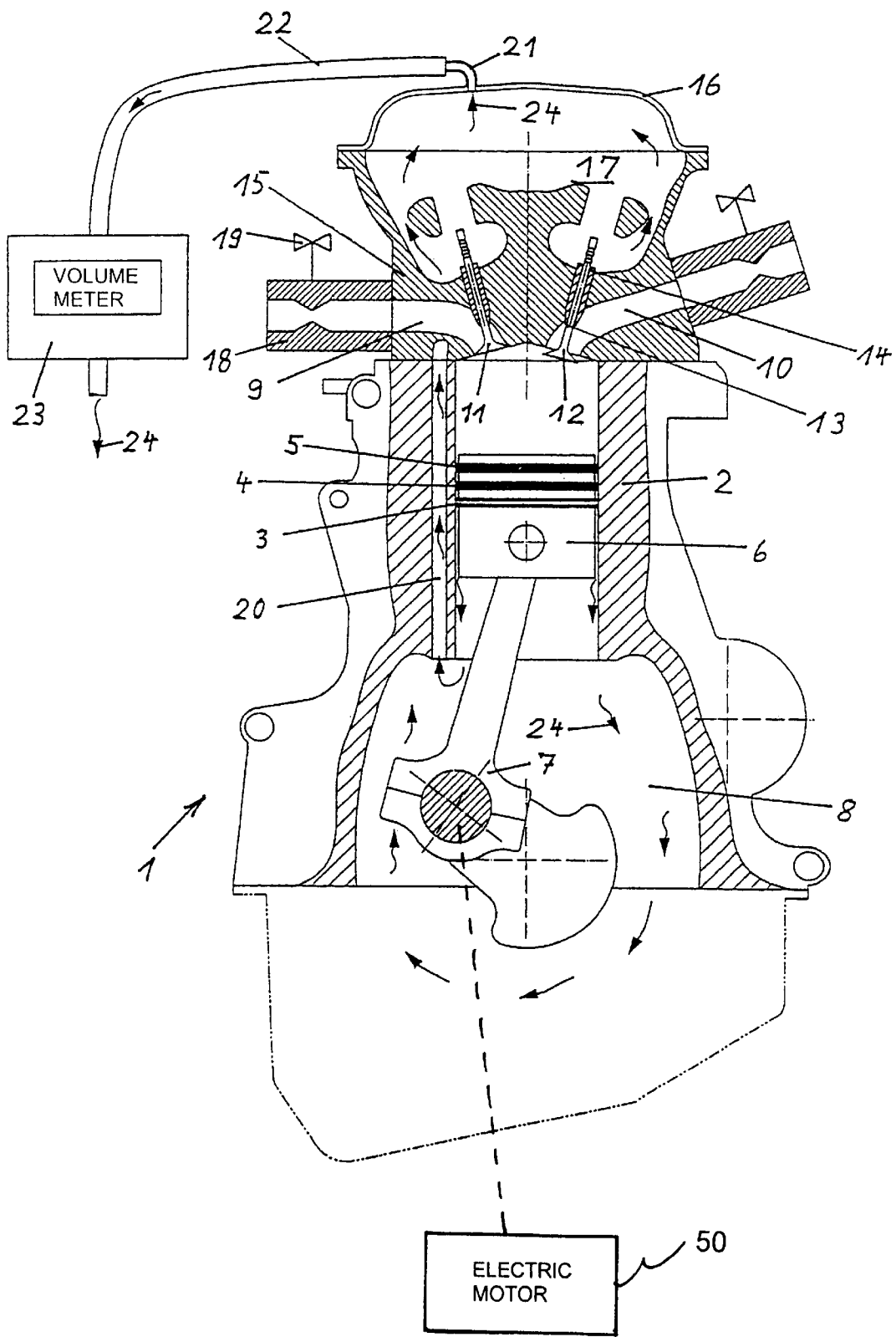

METHOD FOR TESTING AN INTERNAL COMBUSTION ENGINE FOR ASSEMBLY AND/OR MANUFACTURING FAULTS

CROSS-REFERENCE TO RELATED APPLICATION

This application is a continuation of copending International Application PCT/EP00/06055, filed Jun. 29, 2000, which designated the United States.

BACKGROUND OF THE INVENTION

Field of the Invention

The invention relates to a method for testing an internal combustion engine. The engine is driven under traction by an electric motor, and the internal combustion engine is brought to a predetermined rotational speed.

A method of this type is known from Published, Non-Prosecuted German Patent Application DE 196 54 137 A1, European Patent EP 0 456 244 B1 and Published, European Patent Application EP 0 536 561 A1. Testing is carried out here by the torque of the electric traction motor being measured, specific torque values being an indication of faulty engines.

Furthermore, U.S. Pat. No. 4,448,063 discloses a method for testing an internal combustion engine, in which oil under pressure is introduced as a test medium.

Determining the torque values is a complicated method and may lead to inaccurate measurement results.

SUMMARY OF THE INVENTION

It is accordingly an object of the invention to provide a method for testing an internal combustion enginge for assembly and/or manufacturing faults that overcomes the above-mentioned disadvantages of the prior art methods of this general type, which does not require any torque measurement values.

With the foregoing and other objects in view there is provided, in accordance with the invention, a method for testing internal combustion engines for assembly and manufacturing faults. The method includes the steps of driving an internal combustion engine under traction with an electric motor; bringing the internal combustion engine to a predetermined rotational speed; measuring a volume of air entering a crankcase ventilation system of the internal combustion engine during a traction movement; comparing a measured air volume with desired values of a fault-free internal combustion engine; and inferring at least one of an assembly fault and a manufacturing fault being present if the measured air volume deviates from the desired values.

Accordingly, during, the traction movement, the air volume entering the crankcase ventilation is measured the measurement value is compared with desired values of a fault-free internal combustion engine and assembly and/or manufacturing faults are inferred from deviations. The air volume passing the piston rings and/or the valve-stem gasket is determined, along the path that it follows through the crankcase via the crankcase ventilation, by a suitable measuring device.

Accurate fault detection is achieved by this path which is independent of the torque of the electric motor.

Preferably, during the traction movement, an outlet duct of the internal combustion engine is at least temporarily closed.

As a result of this measure, during the exhaust stroke, the pressure in the combustion space of the internal combustion engine rises, which represents a rise in the volume flow entering the crankcase ventilation.

In order to achieve an automatic test sequence, characteristic faults, such as, for example, the absence of a specific piston ring or of a valve-stem gasket, are simulated, so that direct reference values are available.

Particularly in order to detect the absence of a valve-stem gasket, a supporting pressure is applied on the suction side or delivery side, the increased volume quantity being maintained by the slide in the intake or outlet pipe being closed.

In accordance with another mode of the invention, there is the step of setting the predetermined rotational speed to be between 15 $\text{min}^{-1}$ and 100 $\text{min}^{-1}$.

In accordance with a concomitant mode of the invention, there is the step of applying a supporting pressure on an exhaust-gas side of the internal combustion engine.

Other features which are considered as characteristic for the invention are set forth in the appended claims.

Although the invention is illustrated and described herein as embodied in a method for testing an internal combustion enginge for assembly and/or manufacturing faults, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a diagrammatic, partial sectional view through an internal combustion engine according to the invention.

DESCRIPTION OF THE PREFERRED EMBODIMENTS

Referring now to the single figure of the drawing, there is shown an internal combustion engine 1. The engine 1 has a piston 6 sealed off by three piston rings 3, 4, 5 and moves in a cylinder 2 and drives a crank mechanism 7 that is disposed in a crankcase 8. An inlet duct 9 and an outlet duct 10 are capable of being closed by valves 11, 12. A respective valve stem 13 passes, with a valve-stem gasket 14 interposed, through a valve body 15 which, together with a valve cover 16, delimits a space 17. The inlet and outlet ducts 9, 10 are assigned supports 18, the flow cross section of which is capable of being varied or shut off via slides 19.

The internal combustion engine, which, after being assembled, is under traction from an electric motor 50 (only symbolically shown and connected) with a predeterminable rotational speed for the purpose of testing for assembly and/or manufacturing faults. The engine 1 is equipped with crankcase ventilation, a duct 20 of which terminates in the space 17. Attached to a pipe bend 21 passing through the valve cover 16 is a hose 22 of a volume meter 23 which measures a volume flow, symbolized by the arrows 24, dynamically over time.

The volume flow measured in liters per minute in the volume meter 23 is compared with the volume flow values of a fault-free internal combustion engine. Deviations from the desired values indicate faults. Specific faults, such as, for example, the absence of a piston ring, are simulated and are assigned to a measurement value. When the measurement value appears during the test operation, it can immediately be assigned to this fault. Assembly and/or manufacturing faults are thus inferred locally and sequentially from deviations. By the connecting duct 10 being closed, the pressure in the combustion space rises during the exhaust stroke, thus bringing about an increase in the air volume (also designated as the blow-by gas quantity) which flows into the crankcase in the region of the piston rings.

The volume flowing in the direction of the space 17 in the region of the valve-stem guide can also be determined. Preferably, a supporting pressure is applied either on the suction side or on the exhaust-gas side, a slide being closed either in the suction pipe or in the exhaust pipe.

We claim:

1. A method for testing internal combustion engines for assembly and manufacturing faults, which comprises the steps of:

driving an internal combustion engine with an electric motor, and bringing the internal combustion engine to a predetermined rotational speed;

measuring a volume of air entering a crankcase ventilation system of the internal combustion engine during the driving step;

comparing a measured air volume with desired values of a fault-free internal combustion engine;

inferring at least one of an assembly fault and a manufacturing fault being present if the measured air volume deviates from the desired values; and simulating characteristic faults serving as reference values for determining specific faults.

2. The method according to claim 1, which comprises during the driving step, closing, at least temporarily, an outlet duct of the internal combustion engine.

3. The method according to claim 1, which comprises setting the predetermined rotational speed to be between 15 rpm and 100 rpm.

4. The method according to claim 1, which comprises applying a supporting pressure on a suction side of the internal combustion engine.

5. The method according to claim 1, which comprises applying a supporting pressure on an exhaust-gas side of the internal combustion engine.

* * * * *